(12) United States Patent
Chang

(10) Patent No.: US 9,318,089 B2
(45) Date of Patent: Apr. 19, 2016

(54) SOUND AMPLIFYING CASES FOR ELECTRONIC DEVICES

(71) Applicant: Fasst Products, LLC., Rockville Centre, NY (US)

(72) Inventor: Chia-Hsiu Chang, Taipei (TW)

(73) Assignee: FASST PRODUCTS, LLC, Rockville Centre, NY (US)

( * ) Notice: Subject to any disclaimer, the term of this patent is extended or adjusted under 35 U.S.C. 154(b) by 22 days.

(21) Appl. No.: 14/445,738

(22) Filed: Jul. 29, 2014

(65) Prior Publication Data

US 2016/0035336 A1 Feb. 4, 2016

(51) Int. Cl.
| | |
|---|---|
| *H04M 1/00* | (2006.01) |
| *G10K 11/08* | (2006.01) |
| *H04M 1/02* | (2006.01) |
| *H04M 1/62* | (2006.01) |

(52) U.S. Cl.
CPC .............. *G10K 11/08* (2013.01); *H04M 1/0202* (2013.01); *H04M 1/62* (2013.01)

(58) Field of Classification Search
USPC .............................. 455/575.1, 550.1; 345/158
See application file for complete search history.

(56) References Cited

U.S. PATENT DOCUMENTS

| | | |
|---|---|---|
| 8,005,517 B2 | 8/2011 | Kang et al. |
| 8,028,794 B1 | 10/2011 | Freeman |
| 8,412,289 B1 | 4/2013 | Oh |
| 8,596,412 B1 | 12/2013 | Jorgensen |
| 8,700,107 B1 * | 4/2014 | Oh .......................... H04M 1/04 381/322 |
| 8,708,142 B2 | 4/2014 | Rayner |
| 9,049,911 B1 * | 6/2015 | Wood ..................... A45C 11/00 |
| 2012/0012483 A1 | 1/2012 | Fan |
| 2013/0043777 A1 * | 2/2013 | Rayner ................. G06F 1/1626 312/296 |
| 2013/0045782 A1 | 2/2013 | Simmer |
| 2013/0334072 A1 | 12/2013 | Rayner |
| 2014/0057685 A1 | 2/2014 | Shih |

(Continued)

FOREIGN PATENT DOCUMENTS

| | | | | |
|---|---|---|---|---|
| CN | 203180983 U | 9/2013 | | |
| JP | 3187025 U | 11/2013 | | |
| WO | WO 2012/112790 | * | 8/2012 | ................ G06F 1/16 |
| WO | WO 2014/043282 | * | 3/2014 | .......... H04M 1/0202 |

OTHER PUBLICATIONS

Macally Slim Folio Leather Stand Case for iPhone 5, Assorted Colors, Walmart; available at http://www.walmart.com/ip/Macally-Slim-Folio-Leather-Stand-Case-for-iPhone5,AssortedColors; downloaded May 7, 2014.

(Continued)

*Primary Examiner* — Ganiyu A Hanidu
(74) *Attorney, Agent, or Firm* — Gordon & Jacobson, P.C.

(57) ABSTRACT

A sound amplifying case for an electronic device includes a shell that receives and secures the electronic device on a front side of the shell. The shell has a sound channel formed therein which receives sound from the electronic device at an inlet sound port on the shell front side, amplifies the redirected sound, and directs the amplified sound to an outlet sound port on a back side of the shell. The case includes a folding cover attached at one end to the shell back side and extends around one edge of the shell to a free end. With the case in an open configuration, the cover folds between the attached end and the free end forming an acoustic chamber between the cover and the rear side of the shell. The chamber receives the amplified sound from the outlet sound port and further amplifies/redirects it out of the acoustic chamber.

13 Claims, 14 Drawing Sheets

(56) References Cited

U.S. PATENT DOCUMENTS

2014/0069736 A1 3/2014 Freshman et al.
2014/0131225 A1 5/2014 Couch, III et al.
2014/0174846 A1* 6/2014 Molinaro ............... G10K 11/08
　　　　　　　　　　　　　　　　　　　　　　　　　181/177

OTHER PUBLICATIONS

Review: mik Sound Case cranks up the volume on your iPhone, Sarah Guarino, Nov. 23, 2013; available at http://9to5mac.com/2013/11/23/review-mik-sound-case-cranks-up-t...Feed%3A+9To5Mac-MacAllDay+%289+to+5+Mac+-+Apple+Intelligence%29; pp. 1-9; downloaded May 7, 2014.

Mik Releases First of Its Kind Sound Amplifying iPhone Case, PRWeb, Sep. 3, 2013; available at http://www.prweb.com/releases/2013/9/prweb11833340.htm, downloaded May 7, 2014.

Mik Sound Case; Our Technology, mik Sound Case Louder is Better; 2014; available at http://www.miksoundcase.com/Our-Technology_ep_40.html, downloaded May 7, 2014.

Mik Sound Case—Amplify Your iPhone Speaker; mik Sound Case Louder is Better; available at http://www.miksoundcase.com/, downloaded May 7, 2014.

* cited by examiner

SOUND AMPLIFYING CASES FOR ELECTRONIC DEVICES

BACKGROUND

1. Field

This description relates to sound enhancing cases for electronic devices and, more specifically, to sound amplifying cases for portable electronic devices that output sound.

2. State of the Art

Cell phones (such as the iPhone® available from Apple Computer Corp. of Cupertino, Calif., tablet computers (termed "tablets", such as the iPad® and iPad Mini® available from Apple Computer Corp. of Cupertino, Calif.), "phablets" (larger sized smart phones having attributes of small tablet computers), and portable digital media players (such as the iPod® available from Apple Computer Corp. of Cupertino Calif.) have become popular consumer electronic devices. Many such devices provide the capability to output audio through at least one built-in speaker. However, such devices are generally not equipped with high-power speakers, thereby resulting in relatively low audio volume levels even when audio controls on such devices are set to their maximum levels. As a result, in an outdoor setting or a noisy environment, the volume level of the sound output by such devices is often too low to hear and cannot be increased further with the built in speaker. As a result, some users of cell phones, tablets, and phablets forgo listening to audio output through the speaker and instead turn to listening to audio output from their devices through headphones.

SUMMARY

According to a first aspect, a sound amplifying case is described for an electronic device secured to the case. The electronic device can be a cell phone, smart phone, phablet, tablet, as well as a digital media player, for example. The case includes a shell constructed to receive and secure the electronic device on a front side of the shell. The shell can be formed from a rigid material, such as plastic or metal. The shell has a sound channel formed therein. The sound channel is constructed to receive sound from the electronic device at an inlet sound port on the front side of the shell, amplify the redirected sound, and direct the amplified sound to an outlet sound port on a back side of the shell. The sound channel can be integrally formed with the shell or can be formed separately and joined to the shell. The case includes a folding cover hingedly attached at one end thereof to the back side of the shell and extends around one edge of the shell to a free end. When the case is in an open configuration the cover is constructed to fold between the attached end and the free end forming an acoustic chamber between the cover and the rear side of the shell. The acoustic chamber receives the amplified sound from the outlet sound port and further amplifies and redirects the received sound out of the acoustic chamber.

In one embodiment, the cover includes a front portion and a back portion foldable along a spine between the front portion and the back portion. The front portion is configured to conceal the front side of the shell when the case is in a closed configuration and is configured to reveal the front side of the shell when the case is in the open configuration. In the open configuration, the shell is retained between the front portion and the rear portion at an angle with respect to the front portion.

According to a second aspect, a sound amplifying case is described for an electronic device secured to the case. The case includes a shell constructed to secure the electronic device to the shell. The shell has a sound channel formed therein. The sound channel is constructed to receive sound from the electronic device at an inlet sound port on a first side of the shell, amplify the redirected sound, and direct the amplified sound to an outlet sound port on a second side of the shell different from the first side. Also, the case includes a folding cover hingedly attached at one end thereof to the second side of the shell and extending around one edge of the shell to a free end. When the case is in an open configuration the cover is constructed to fold between the attached end and the free end forming an acoustic chamber between the cover and the second side of the shell. The acoustic chamber receives the amplified sound from the outlet sound port and further amplifies and redirects the received sound out of the chamber.

According to a third aspect, a method is described of amplifying sound generated from an electronic device secured to a sound amplifying case, constructed according to the second aspect discussed hereinabove. The method includes opening the sound amplifying case, receiving sound at an inlet sound port from the electronic device, introducing amplified sound from an outlet sound port into an acoustic chamber, further amplifying the amplified sound in the acoustic chamber, and redirecting the further-amplified sound out of the acoustic chamber.

The features described in this summary and the following detailed description are not exhaustive. Additional features will be apparent to one of ordinary skill in the art in view of the drawings, specification, and claims hereof.

DETAILED DESCRIPTION

Figure 1:
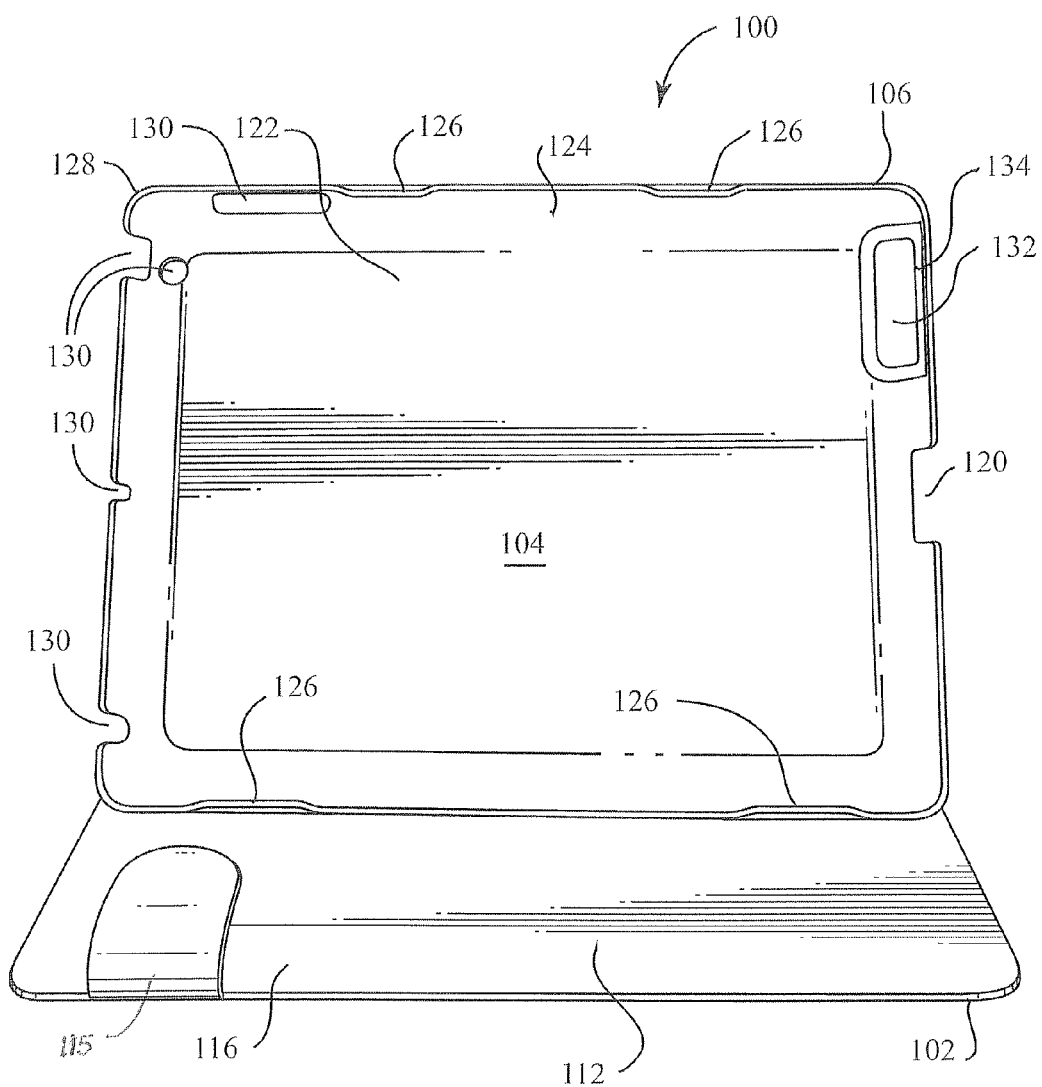
FIG. 1 is an isometric view of an embodiment of a sound amplifying case for an electronic device, viewed from a front side thereof and shown in an open configuration.

FIGS. 1 to 10 show an embodiment of a sound amplifying case 100 for an electronic device (not shown) and, more specifically, for a tablet, such as an iPad® (available from Apple Computer Corp. of Cupertino, Calif.). It will be appreciated, however, that the following concepts are applicable to other electronic devices, such as cell phones, phablets, and portable digital media players. The case 100 includes a foldable cover 102 and a shell 104. The cover 102 can be formed of rigid and semi-rigid materials, including plastic, metal, and leather. In one embodiment, the cover 102 is made of a leather or artificial leather material coating or surrounding thin polycarbonate sheets. The shell 104 can be formed of a rigid material, such as plastic or metal. Alternatively, the shell 104 and the cover 102 can be integrally formed of a semi-rigid material, such as hard elastomeric material, such as rubber. The cover 102 is attached to a back side 110 of the shell 104 by an adhesive or other means. In at least one embodiment, the cover 102 is constructed to be removably attachable by using Velcro (a trademark of Velcro Industries, B.V. of the Netherlands Antilles), snaps, magnets or other attachment means rather than glue.

The case 100 is shown in FIGS. 1 to 4 in a first open configuration in which the cover 102 is opened to reveal the shell 104 (as well as to uncover an electronic device (not shown) secured to the shell 104). More specifically, in the first open configuration, the shell 104 is propped at an angle with respect to the cover 102, as shown most clearly in FIGS. 2 and 4.

Figure 9:
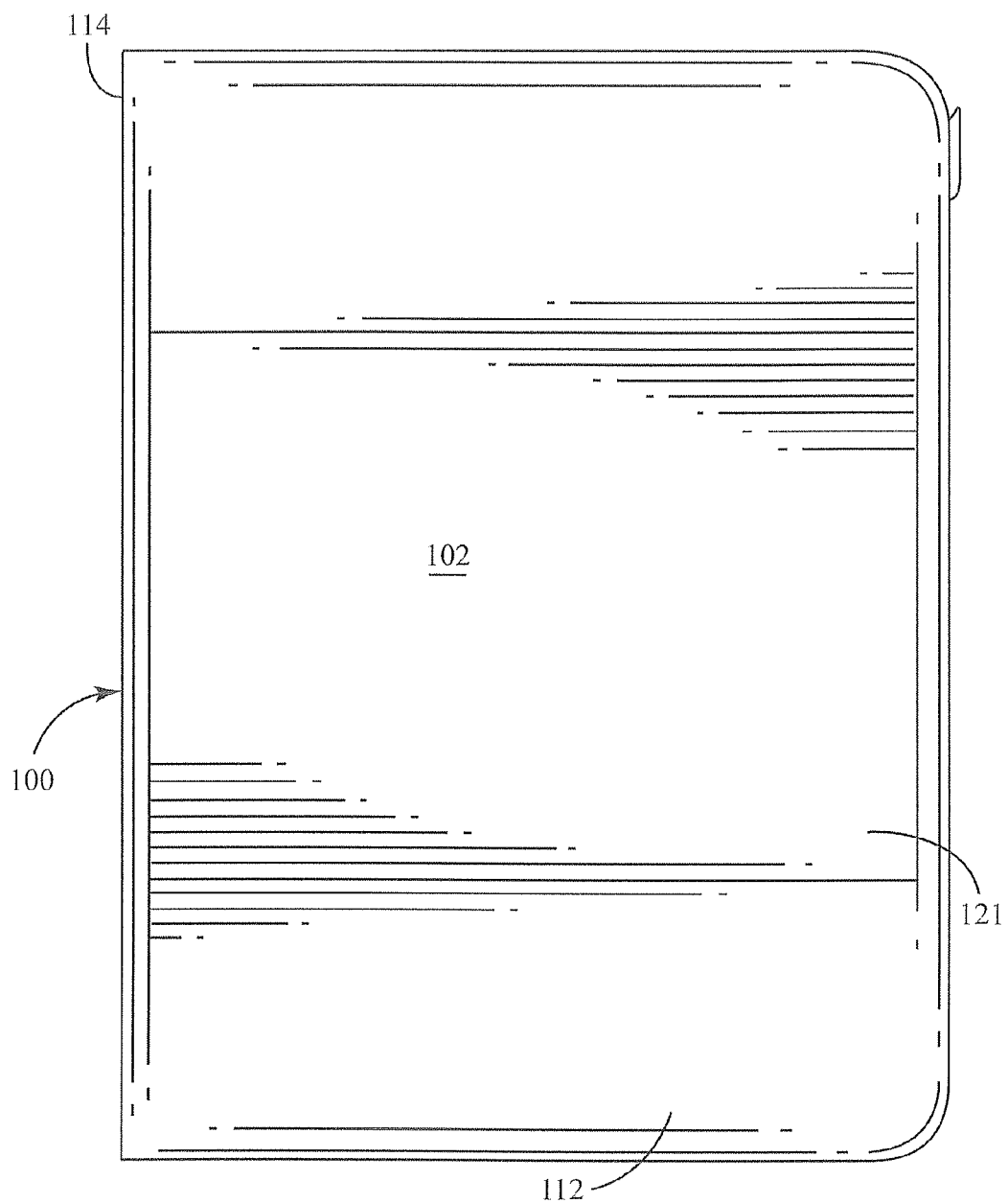
FIG. 9 is a front plan view of the case shown in FIG. 1, in a closed configuration.
Figure 10:
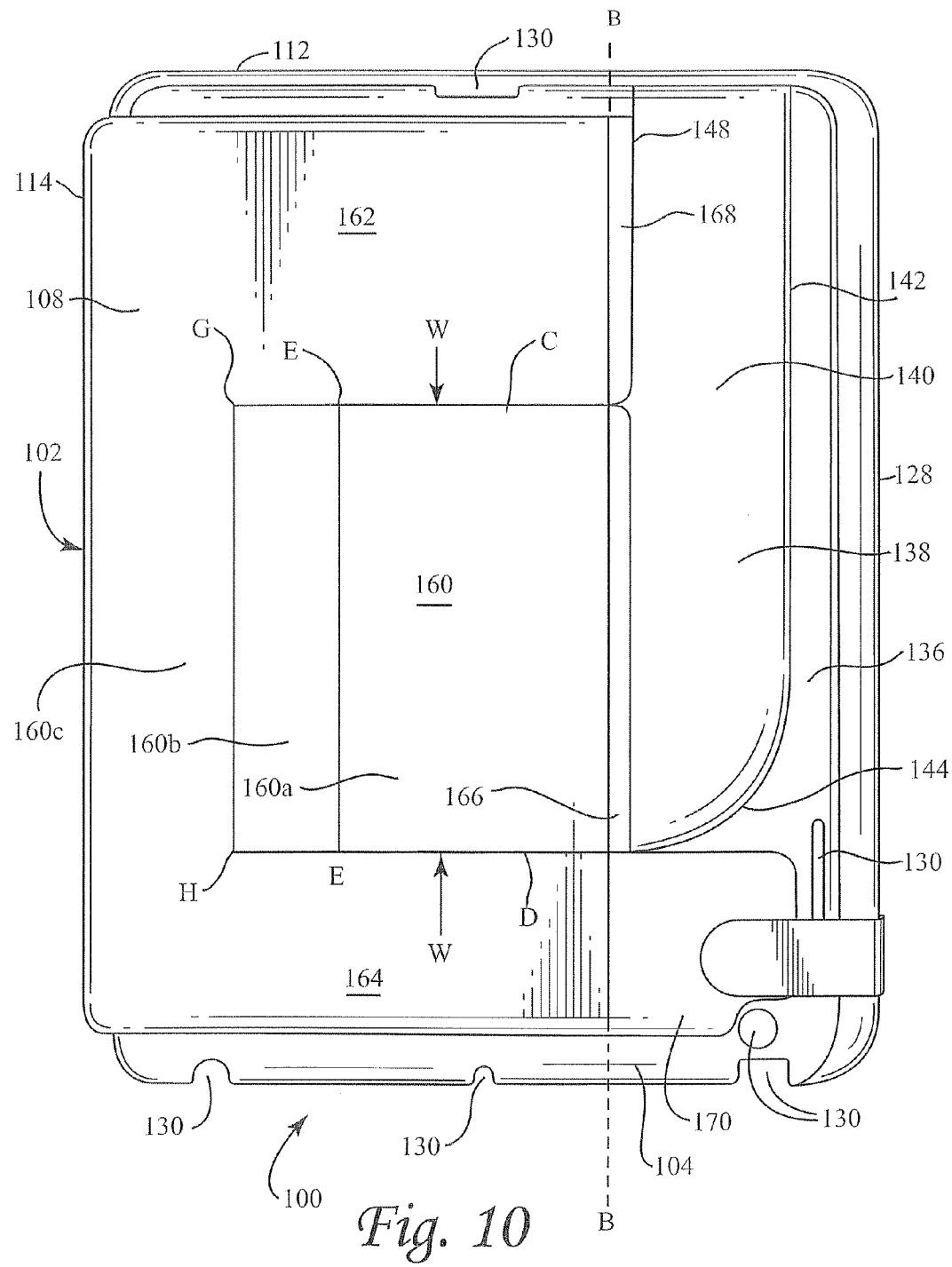
FIG. 10 is a rear plan view of the case shown in FIG. 1, in the closed configuration.

The cover 102 includes a front portion 112, a back portion 108, and a spine 114 between the front and the back portions. The front portion 112 and the back portion are foldable about a spine 114 like a jacket of a book. As shown in FIG. 9, the front portion 112 generally covers the front side 106 of the shell 104 when the sound amplifying case 102 is in the closed configuration, thereby covering and protecting the electronic device being held. The back portion 108 partially covers a back side 110 of the shell 104. In the closed configuration, shown in FIG. 10, the back portion 108 extends parallel with the back side 110 of the shell 104 and the front portion 112 wraps over the shell 104 and covers the front side 106 of the shell 104 so that the front portion 112 extends parallel with the back portion 108. As seen best in FIGS. 2, 4, and 5, a tab 115 with a magnetic element (not shown) may be provided to hold the cover 102 in position when covering and protecting the electronic device as in FIG. 9.

The front portion 112 of the cover 102 has an inner side 116 in which transverse grooves 118 are formed. The grooves 118 receive a first transverse edge 120 of the shell 104 when the case 100 is in the first open configuration. A plurality of grooves 118 are provided to permit the shell 104 to be positioned at different angles with respect to the front portion 112 of the cover 102; e.g., a substantially perpendicular position and a substantially 60 degree position, where the term "substantially" as used herein with respect to an angle means +/−10 degrees.

In one embodiment, the front portion 112 of the cover is provided with one or more thin polycarbonate plates (not shown) internal the material of the front portion 112. In one embodiment, the front portion 112 of the cover is provided with three thin polycarbonate plates (not shown) corresponding to the three sections of the front portion shown in FIG. 5; i.e., the section attached to the spine 114, the section between the grooves 118, and the section with the tab 115. Thus, the grooves may be formed due to the fact that the front portion 112 is thinner at specific locations where the polycarbonate plates are not present. In one aspect, the polycarbonate plates can be useful in amplifying certain frequencies of sound emanating from the electronic device.

Figure 5:
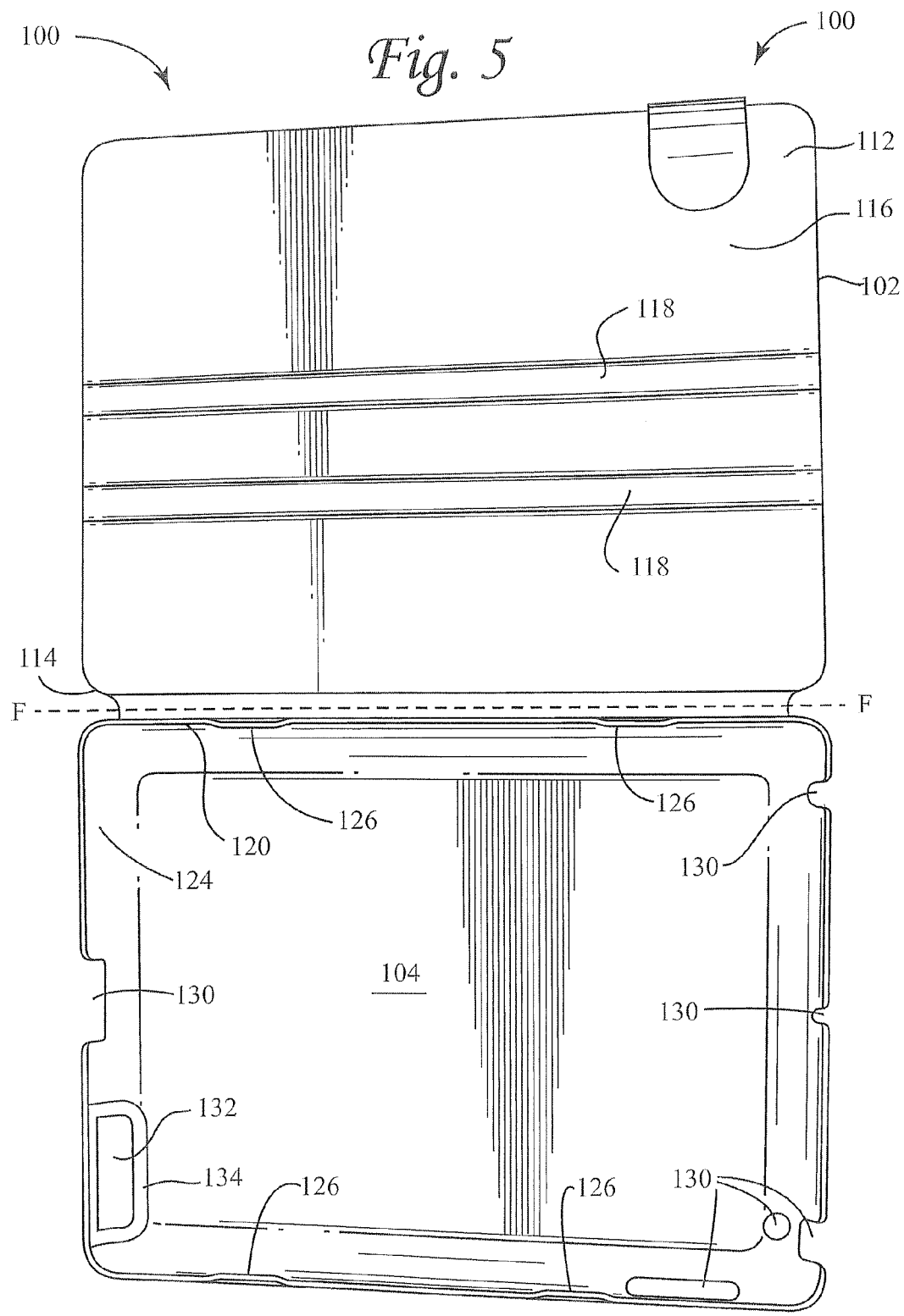
FIG. 5 is a plan view of the sound amplifying case shown in FIG. 1, shown laid flat and viewed from a top side of the case.

Turning momentarily to FIG. 5, the case 100 can assume a second open configuration in which the shell 104 is not propped at an angle, but instead is laid flat (extends parallel) with the cover 102 to reveal the front side 106 of the shell 104.

Figure 6:
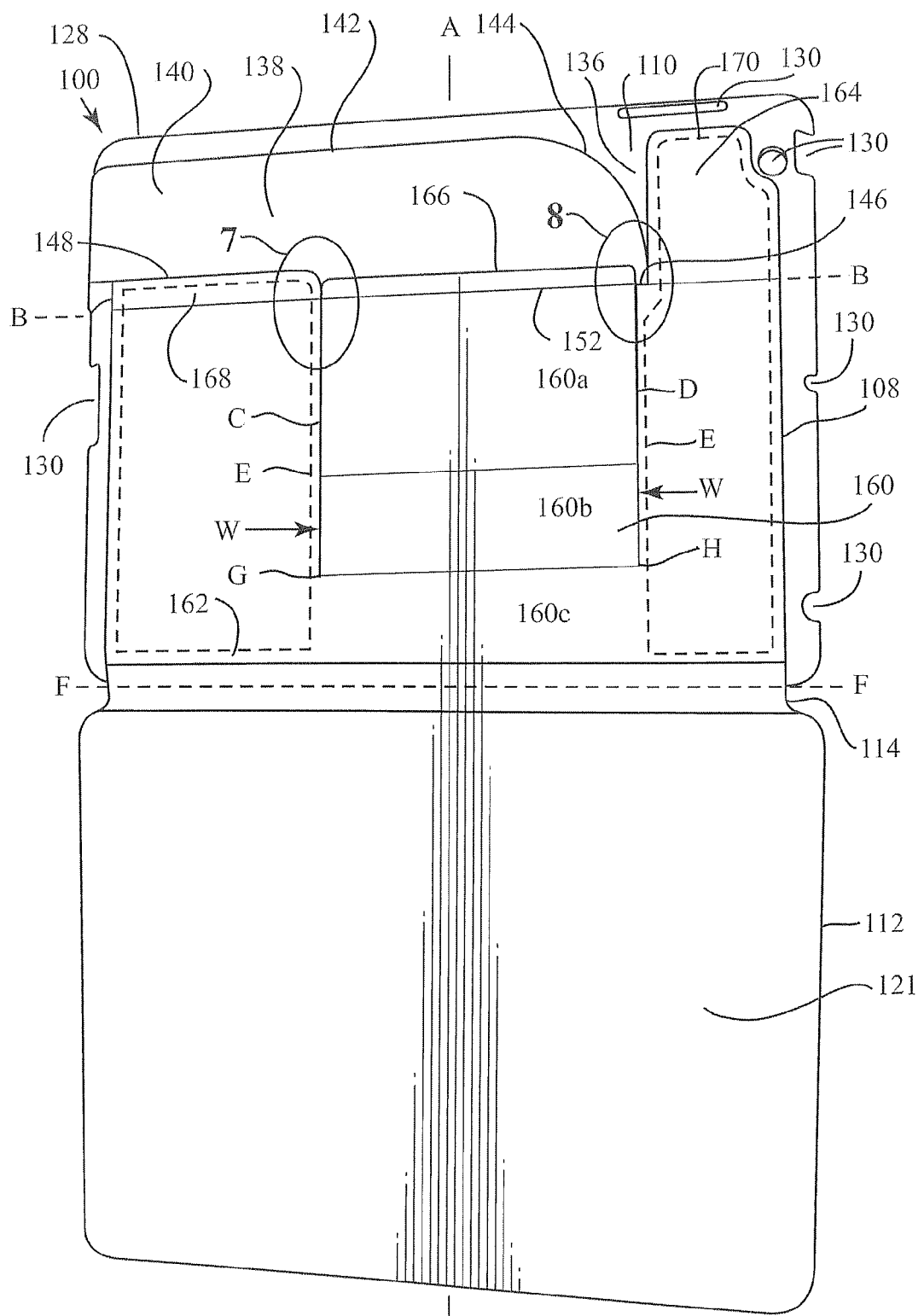
FIG. 6 is a plan view of the sound amplifying case shown in FIG. 1, shown laid flat and viewed from a bottom side of the case.
Figure 7:
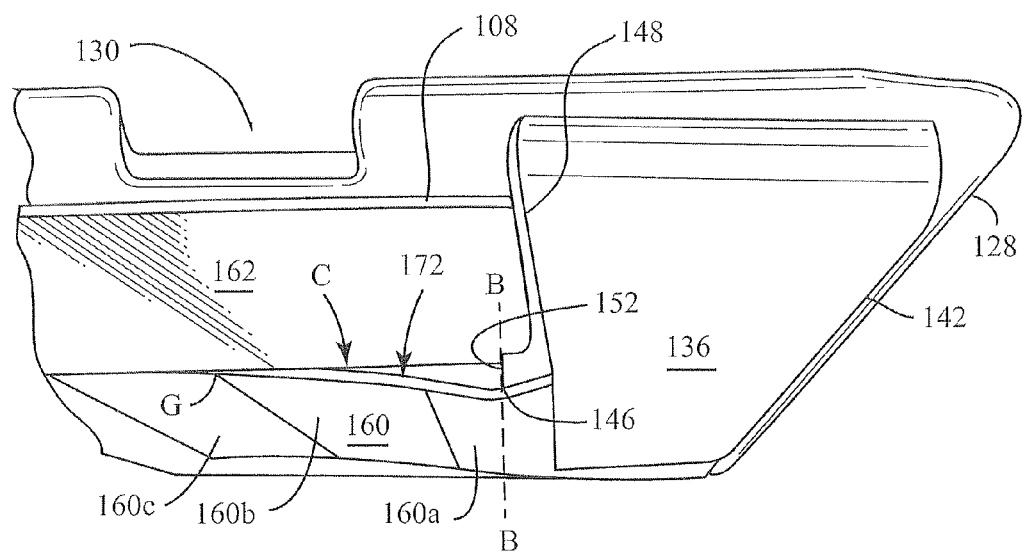
FIG. 7 is an exploded view of a portion, labeled "FIG. 7", of the case shown in FIG. 6.

FIG. 6 shows the case 100 viewed from a side opposite to that shown in FIG. 5. As shown in FIG. 6, the front portion 112 of the cover 102 has an outer side 121, which is opposite inner side 116 and which is often placed on a surface when the case is in the first open configuration, shown in FIGS. 1 to 4, for example. The back portion 108 of the cover 102 partially covers a back side 110 of the shell 104. Although the back portion 108 is shown in FIG. 6 as only partially covering the back side 110, it will be appreciated that in at least one other embodiment, the back portion 108 can completely cover the back side 110 of the shell 104.

Figure 2:
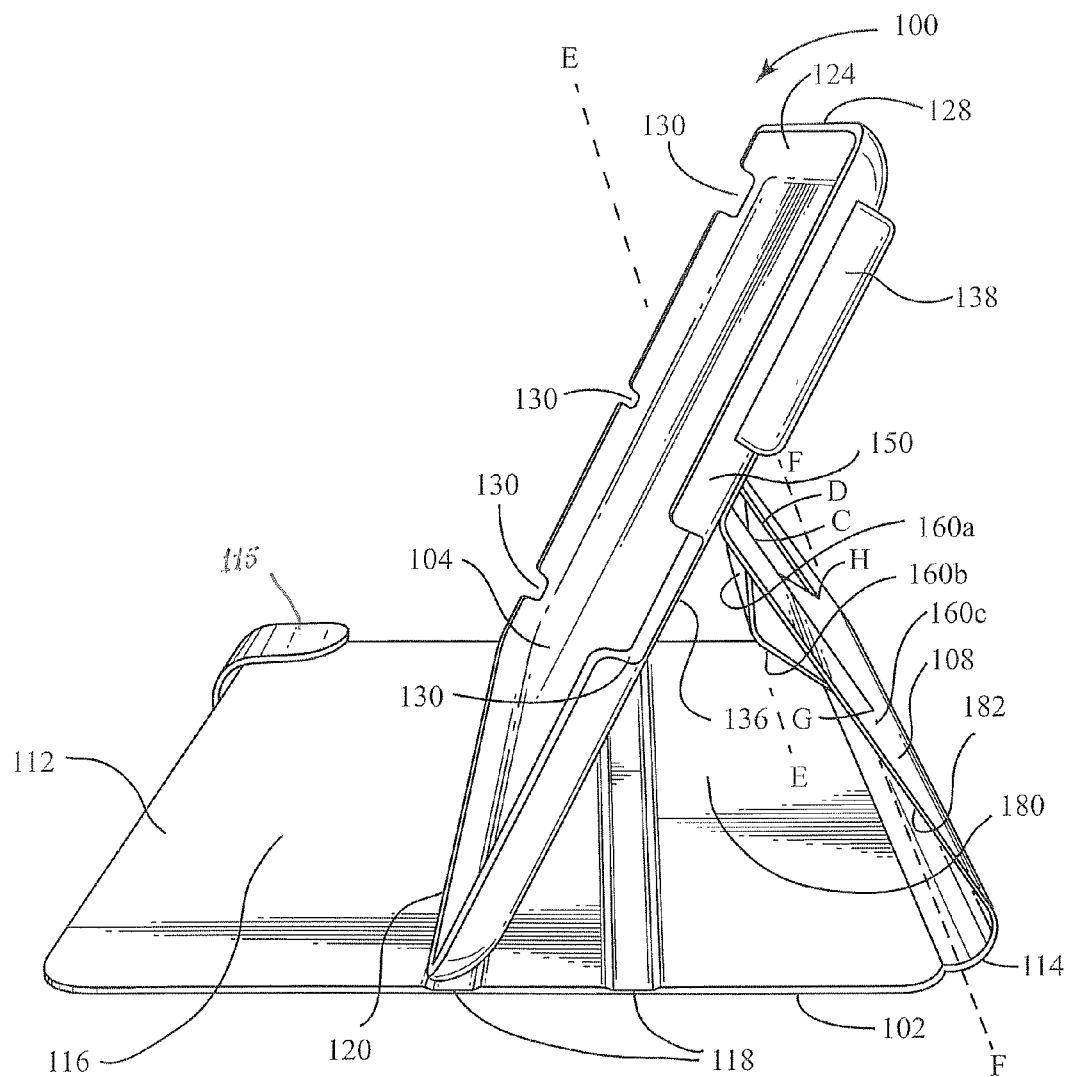
FIG. 2 is an isometric view of the sound amplifying case shown in FIG. 1, viewed from a right and top side thereof.
Figure 3:
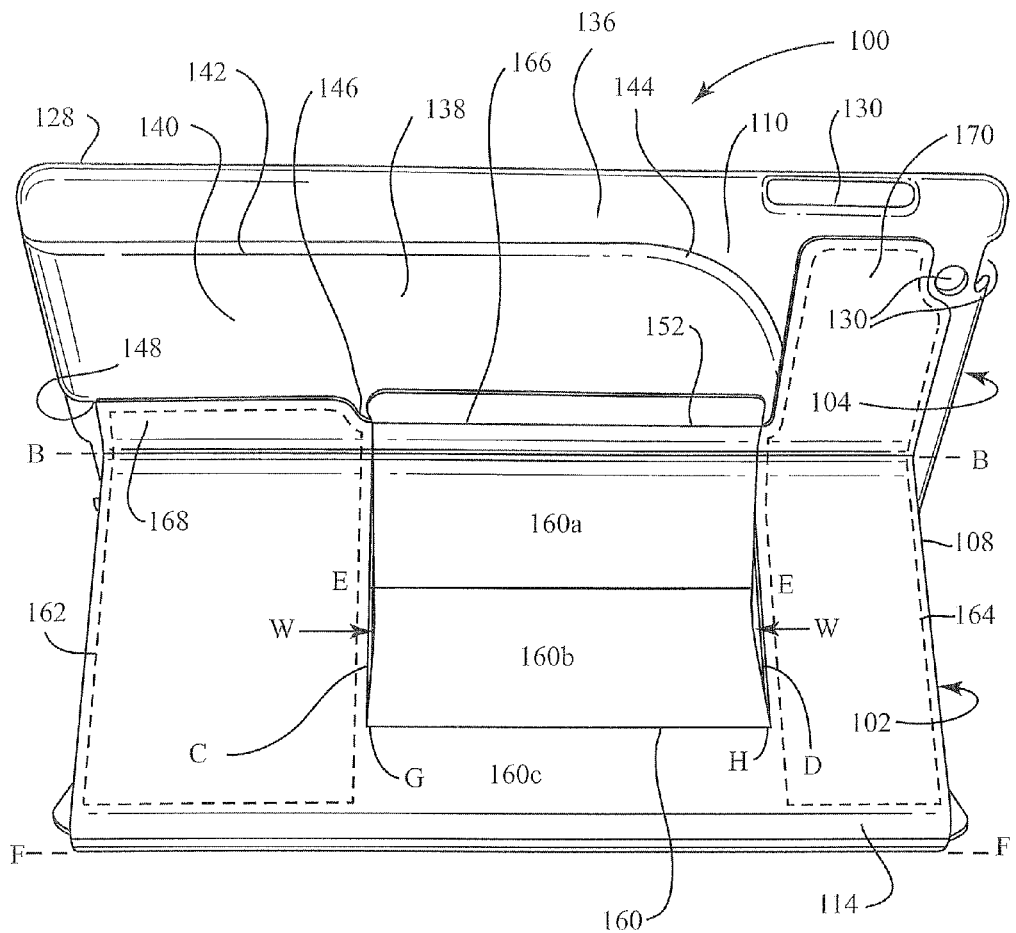
FIG. 3 is an isometric view of the sound amplifying case shown in FIG. 1, viewed from a rear and top side thereof.
Figure 4:
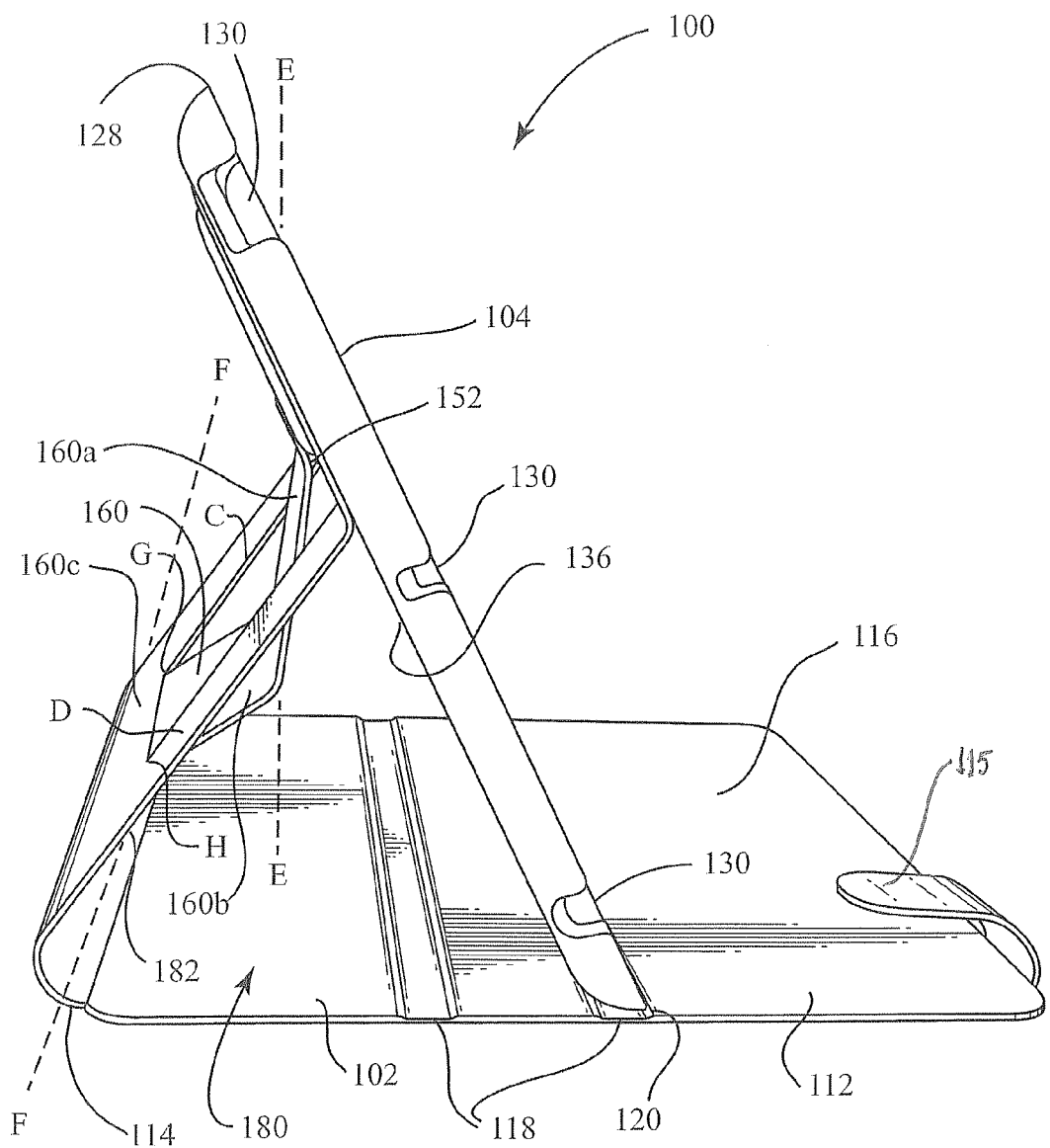
FIG. 4 is an isometric view of the sound amplifying case shown in FIG. 1, viewed from a left and top side thereof.

As shown in FIGS. 3 and 6, the back portion 108 of the cover 102 is attached to the back side 110 of the shell 104 and is bent along transverse line B-B. As previously suggested, in one embodiment, the cover 102 is attached to the shell 104 with an adhesive at portions 166, 168, and 170 above line B-B. It will be appreciated by those of ordinary skill in the art that other attachment types are possible and are included within the scope of this disclosure. For example, velcro can be used to attach the cover 102 to the shell 104 to provide for a removably attached cover. As shown in FIG. 6 (as well as in the closed configuration) the back portion 108 is not angled with respect to the back side of the shell 110. However, when the case 100 is in the first open configuration (as shown in FIGS. 2 and 4 for example), most of the back portion 108 with the exception of attached portions 166, 168, and 170 is angled with respect to the back side 110 of the shell 104.

Turning again to FIG. 1, the shell 104 has a generally concave front side 106 that is suitably dimensioned to receive an electronic device, such as an electronic tablet computer, thereon. The front side 106 has an inner region 122 and a peripheral region 124 that surrounds the inner region 122 and terminating in a rim 128. The inner region 122 is generally solid and flat, while the outer region 124 is generally curved and has a plurality of openings 130 and 132, described further below.

Tabs or clips 126 extend inward from an outer rim 128 of the peripheral region 124. The tabs or clips 126 are constructed to secure the electronic device to the shell 104 in a snap fit connection, as is known in the art. A plurality of cutouts 130 are formed in the peripheral region 124 that permit access to connectors and switches of the electronic device when the device is secured to the shell 104.

An inlet sound port 132 is also formed in the outer region 124. The inlet sound port 132 is surrounded by a gasket 134. The inlet sound port 132 is located in alignment with a location of a speaker of the electronic device (not shown) when the electronic device is secured to the shell 104. When so secured to the shell 104, the gasket 134 contacts the electronic device in an area surrounding the speaker to form a seal between the speaker and the inlet sound port 132.

Turning again to FIG. 6, the back side 110 of the shell 104 is defined by a generally planar surface 136, with the exception of a sound channel 138, which is defined between the generally planar surface 136 and a raised outer surface 140. As shown in FIG. 6, the channel 138 is also defined by a generally transverse upper edge 142, a curved rightward edge 144, a generally transverse first lower edge 146, and a generally transverse second lower edge 148, which is displaced upward from the first lower edge 146. The sound channel 138 extends transversely (right to left in FIG. 6) across a portion of the back side 110 of the shell 104 and wraps around a portion of the right side 150 (FIG. 2) of the shell 104 adjacent to inlet sound port 132. The sound channel 138 extends through the shell 104 to the front side 106 so that the sound channel 120 is in communication with the inlet sound port 132. The sound channel 138 extends on the back side 110 to an outlet sound port 152 (which is shown concealed in FIGS. 3 and 6 by the back portion 108 of the cover 102, and shown partially along an edge in FIGS. 4, 7, and 8). Thus, the sound channel 138 extends from the inlet sound port 132 to the outlet sound port 152, which are thereby in communication with each other. The outlet sound port 152 is generally rectangular in its opening and is defined by the raised, first lower edge 146 of the sound channel 138 and the planar surface 136 of the back side 110 of the shell 104. In the first open configuration, such as shown in FIGS. 2 and 4, the outlet sound port 152 projects downwardly, parallel to the back side 110 of the shell 104 and toward the inner side 116 of the front portion 112 of the cover 102.

The sound channel 152 is constructed to direct sound generated from the speaker of the electronic device from the inlet sound port 132 to the outlet sound port 152. The inner construction of the sound channel 152 can be varied to amplify sound, as is described, for example, in U.S. Patent Application Publication No. 2014/0057685, the entire contents of which are incorporated by reference herein in their entirety. The construction of the sound channel 152 can amplify one or more frequencies.

As shown in FIGS. 2, 3, 4, and 6, the back portion 108 of the cover 102 is cut at slits C and D to define an inner part 160 that has a transverse width W that is at least coextensive with the width of the outlet sound port 152. Slits C and D extend in the direction of fold line F to ends G and H, respectively, which are longitudinally spaced from fold line F-F of spine 114. The slits C and D also define a first outer part 162 (defined by broken lines) of the back portion 108 and a second outer part 164 (defined by broken lines) of the back portion 108.

Figure 8:
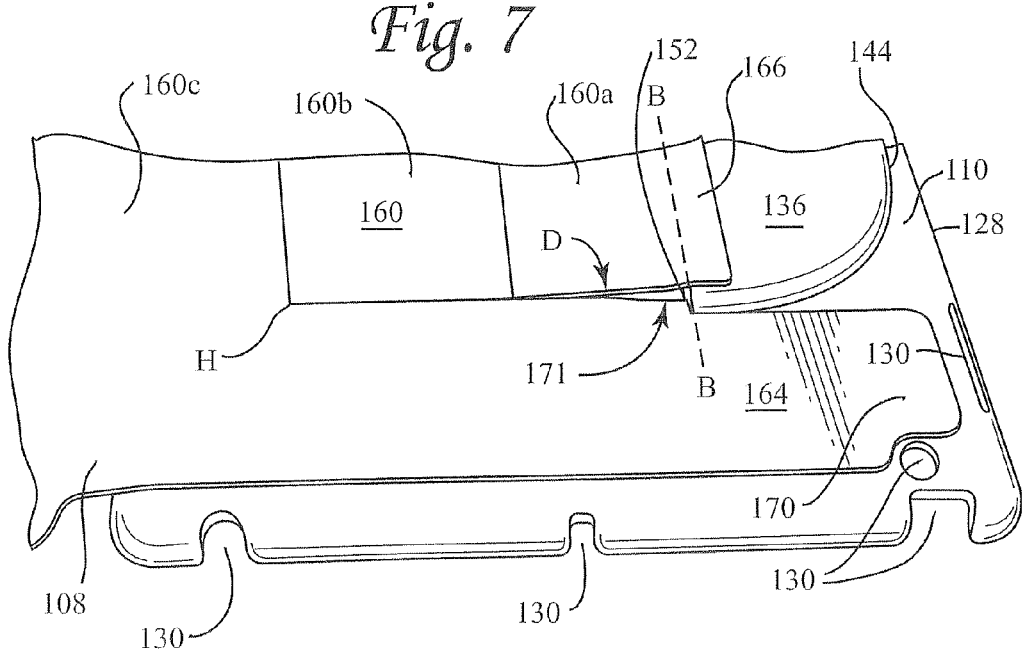
FIG. 8 is an exploded view of a portion, labeled "FIG. 8", of the case shown in FIG. 6.

As noted above, the back portion 108 of the cover 102 is attached to the back side 110 of the shell 104 and is bent along transverse line B-B. Line B-B extends transversely at the position of the outlet sound port 152, such that the line B-B is collinear with the raised, first lower edge of the sound channel. End 166 of the inner part 160 is attached to the outer surface 140 of the sound channel 138 above the raised, first lower edge 146 of the sound channel 138. End 168 of the first part 162 is attached to the surface 136 of the back side 110 of the shell 104, below the edge 148 of the sound channel 138. End 170 of the second part 164 of the back portion 108 is attached to the planar surface 136 of the rear side 110 of the shell 104 to the right of the curved edge 144. Thus, the first part 162 and the second part 164 are flush with the surface 136. However, owing to the slits C and D and its connection at the raised outer surface 140, inner part 160 is angled with respect to the surface 136 of the back side 110 of the shell 104, the first part 162, and the second part 164, forming openings 172 and 171 (shown most clearly in FIGS. 7 and 8). More specifically, opening 171 is formed between slit D and second part 164 and, as shown in FIG. 8, opening 172 is formed between slit C and first part 162. The angle between inner part 160 and surface 136 of the back side 110 of the shell 104 is defined by the length of slits C and D and the distance between surface 136 and the outer surface 140 of sound channel 138. Openings 171 and 172 permit sound to pass through the back side 108 of the cover 102 even when the case 100 is in the closed configuration or when the case 100 is in the second open configuration, shown in FIGS. 5 and 6.

Also, owing to the inner part 160 being slightly angled with respect to surface 136 and first and second parts 162 and 164, the length of inner part 160 from line F-F to line B-B is slightly longer than the corresponding length of the first and second parts 162 and 164 between line F-F and line B-B. Due to those differences in length, the inner part 160 is constructed to bend along transverse line E-E when the sound amplifying is in the first open configuration, as shown, for example, in FIGS. 2 to 4.

As shown in FIGS. 2 and 4, in the first open configuration, the inner part 160 bends along line E-E, defining at least three angles with respect to the surface 136 of the back side 110 of the shell 104. For example, an upper portion 160a of the inner part 160 extends from end 166 attached to the surface 140 and extends at a first angle with respect to surface 136, which is smaller than the angle between the first part 162 and surface 136 and between the second part 164 and surface 136. A middle portion 160b of the inner part 160 extends from the upper portion 160a and is angled at a second angle with respect to surface 136, which is a larger angle than the first angle. Also, a lower portion 160c extends from the middle portion 160b and is angled at a third angle with respect to the surface 136, which is the same angle as between surface 136 and each of the first and second parts 162 and 164 as portion 160c is continuous with parts 162 and 164. Thus, in the direction from end 166 to the ends of slits G and H, the angle between the inner part 160 and surface 136 varies, thereby providing gaps in the back side 108 that aid in sound enhancement.

The sound amplifying case 100 can be opened into the first open configuration and used to amplify sound emitted from an electronic device secured to the case 100. Prior to such use, the case 100 can be opened to the first open configuration, such as that shown in FIGS. 1 to 4, such that the shell 104 can be retained between the inner side 116 of the front portion 112 of the cover 102 and the rear portion 110 of the cover 102, thereby disposing the shell 104 at an angle with respect to the front portion 112 of the cover 102. The shell 104 can be retained at the angle by inserting lower edge 120 of the shell 104 into one of the grooves 118 in the inner side 116 of the front portion 112 of the cover 102. Opening the sound amplifying case 100 into the first open configuration forms an acoustic chamber 180 (see FIGS. 2 and 4) defined between the back side 110 of the shell 104, an inner side 182 of the back portion 108 of the cover 102, and a portion of the inner side 116 of the front portion 112 of the cover 102 between spine 114 and the groove 118 in which the lower edge 120 of the shell 104 is inserted. So defined, the acoustic chamber 180, as shown in FIGS. 2 and 4, has a generally triangular cross section and extends in the transverse direction parallel to the spine 114 to opposed open ends. The chamber 180 is constructed to receive sound from the shell 104 and to further amplify or otherwise enhance the sound. For example, the acoustic chamber can amplify one or more frequencies of the sound. The acoustic chamber 180 redirects the further-amplified or enhanced sound out of the acoustic chamber 180. In one embodiment, the acoustic chamber 180 redirects the further-amplified or enhanced sound towards the front side 106 of the shell 104.

For example, in use in the first open configuration, when the electronic device is secured to the shell 104 and sound is output from the speaker of the electronic device, the sound will pass through the inlet sound port 132 that is aligned with the speaker, the sound channel 140, the outlet sound port 152, and downward into the acoustic chamber 180. The sound output from the sound channel 140 will be enhanced in the acoustic chamber 180 before exiting transversely through the open triangular sides of the acoustic chamber 180 and through gaps in central portion 160.

Because sound is received and redirected in the acoustic chamber 180, the materials used to form the acoustic chamber 180 can affect the attributes of the sound exiting the acoustic chamber 180. For example, smooth surfaces lining the acoustic chamber 180 may create different sound effects than porous or textured surfaces (i.e., sueded leather). Thus, the polycarbonate inserts in the section(s) of the front portion 112 of the cover that forms the bottom of the triangular acoustic chamber 180, if present, can help enhance the sound output. Also, it will be appreciated that if the cover 102 is not used in forming part of the acoustic chamber 180, and instead the shell 104 were propped up on a sofa or on sand at the beach, the sound quality would be inconsistent as the surfaces forming the acoustic chamber 180 (i.e., sofa or sand) differ in acoustic performance. Therefore, it will be appreciated that the use of the shell 104 in combination with the cover 102 ensures consistent performance of the case 100 for sound amplification.

In at least one alternate embodiment, the front portion 112 of the cover 102 is segmented to fold rearward under itself towards the back portion 108 at each respective groove so that the front portion 112 of the cover 102 does not extend past the lower edge 120 of the shell 104 when the case is in the first open configuration. In this manner, less space is occupied by the case 100 when the case is in the first open configuration.

FIGS. 11-15 show an alternate embodiment of a sound amplifying case 1100 for an electronic device, such as a smart phone. The case 1100 includes a cover 1102 and a shell 1104 attached to the cover 1102. The cover 1102 can be attached to the shell 1104 with an adhesive or other means or can be removably attached to the shell with Velcro or other removable means.

The shell 1104 can be formed from a flexible material, such as rubber or plastic. The shell 1104 has a bezel 1105 around the perimeter of the shell 1104. The bezel is constructed to surround an edge of an electronic device (not shown) and retain the electronic device in the shell 1104. An inlet sound port 1132 is formed in the bezel 1105. The inlet sound port 1132 is constructed to align with a speaker of an electronic device when the electronic device is retained in the shell 1104.

Figure 11:
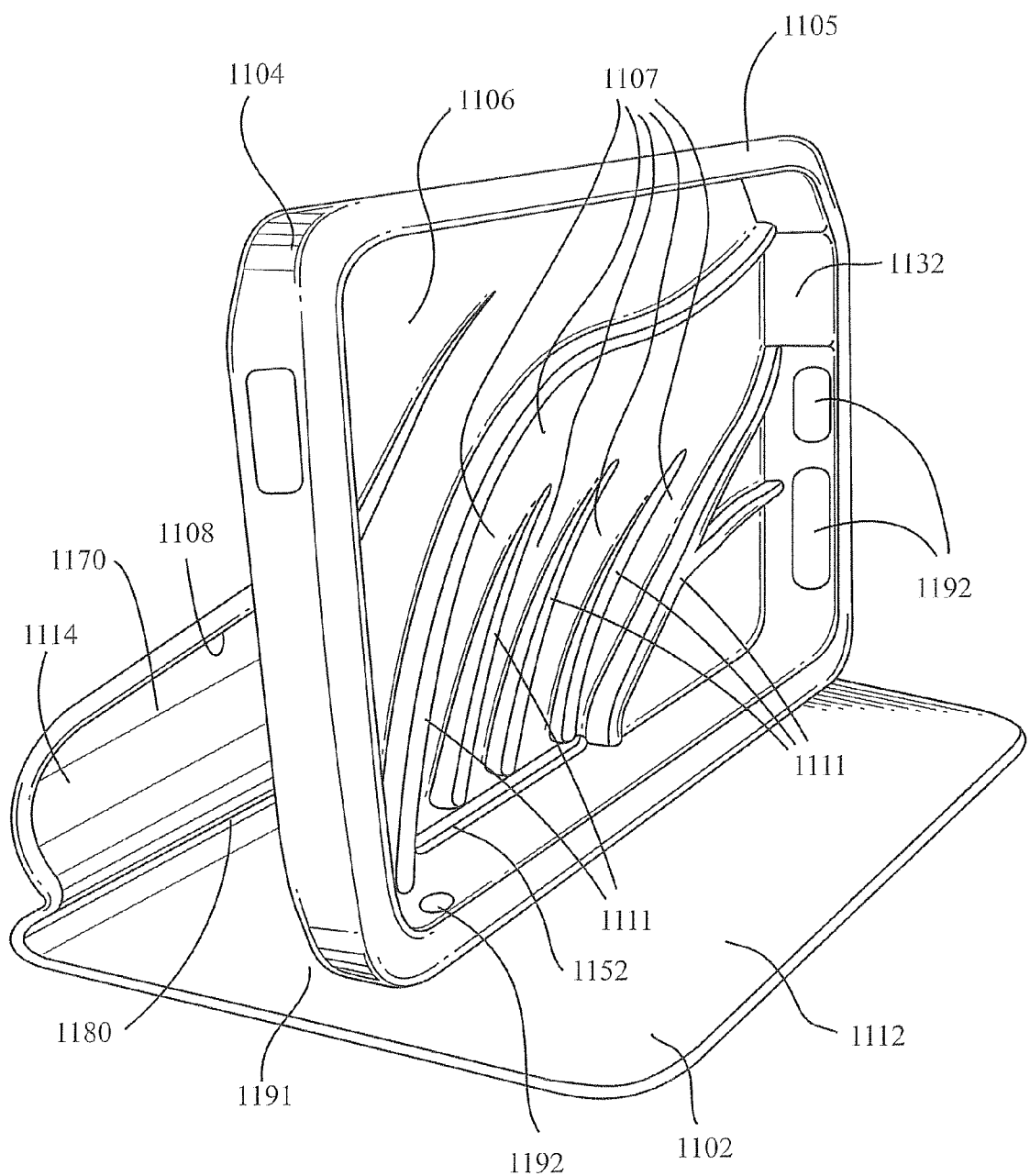
FIG. 11 is an isometric view another embodiment of a sound amplifying case, viewed from a front and a left side thereof in an open configuration.

The shell 1104 has a front side 1106 along which a plurality of wave guides 1111 extend. As shown in FIG. 11, the waveguides 1111 are generally curved. However, in other embodiments, the waveguides can be linear. Sound channels 1107 are formed between the wave guides 1111. The sound channels 1107 extend to a sound outlet port 1152 at the back side of the shell 1104. The sound outlet port 1152 is positioned generally diagonally from the sound inlet port 1132. Wave guides 1111 are constructed to extend from the surface of the front side 1106 such that they contact a back side of an electronic device (not shown) retained in the shell 1104. When so retained, the back side of the electronic device forms an additional surface of each of the sound channels 1107 opposite the surface of the front side 1106. Alternatively, instead of a back side of an electronic device forming a surface of the sound channels 1107, a discrete layer (not shown) can be attached to the wave guides 1111 opposite the surface of the front side 1106 of the shell 1104 to form a surface of the sound channels 1107.

In use, sound output from a speaker of an electronic device retained in the shell 1104 travels through the sound inlet port 1132, the sound channels 1107 (between the surface of the front side 1106 and the back side of the electronic device), and out the sound outlet port 1152. Owing to the construction of the sound channels 1107, the volume of the sound emitted from the sound outlet port 1152 is greater at certain frequencies and for certain directionality than the volume of the sound at the sound inlet port 1132. Thus, the case 1100 amplifies sound output from the electronic device.

Figure 14:
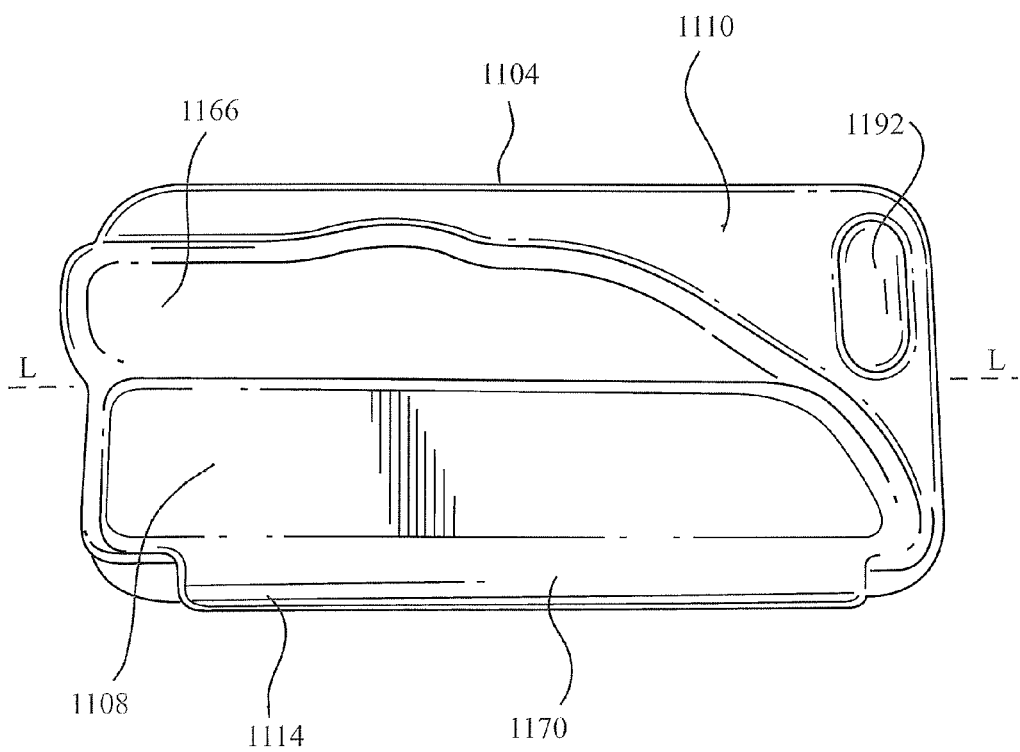
FIG. 14 is a rear plan view of the case shown in FIG. 11, in the closed configuration.
Figure 15:
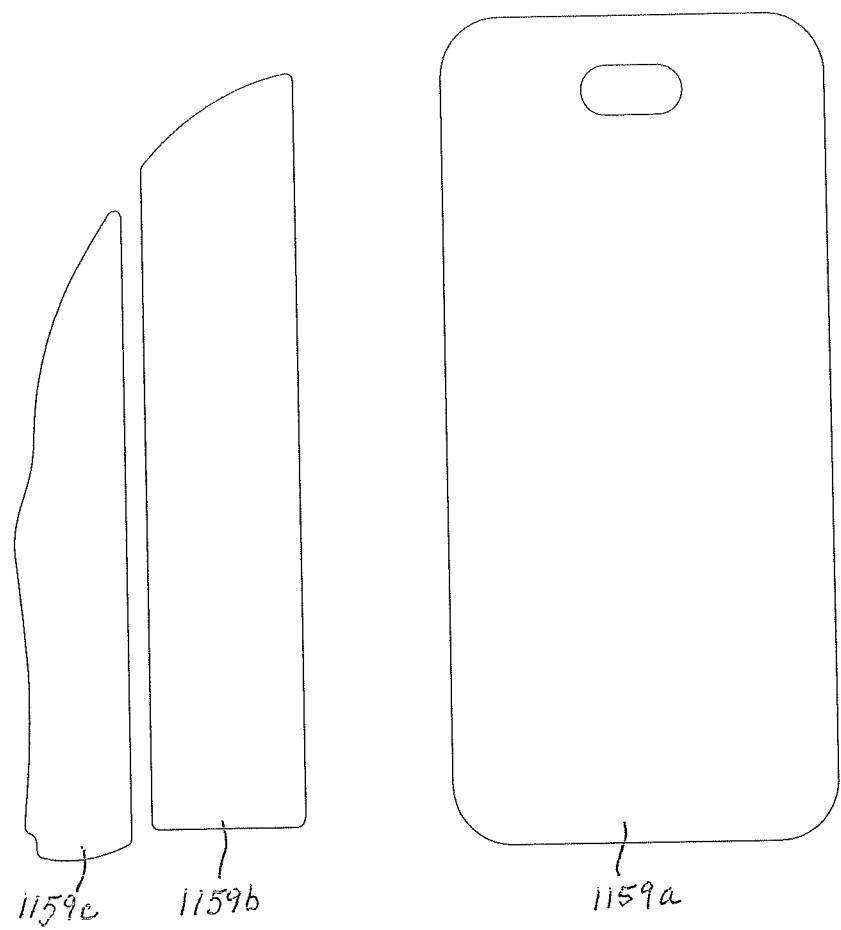
FIG. 15 is front view of polycarbonate inserts used in the case shown in FIG. 11.

The cover 1102 has a front portion 1112 and a rear portion 1108 connected by a spine 1114. The cover 1102 is formed of generally flexible material that has portions reinforced by one or more thin plates formed of a generally rigid material such as polycarbonate. Thus, as seen in FIG. 15, in one embodiment, three plates 1159*a*, 1159*b*, 1159*c* are provided. Plate 1159*a* is covered by the generally flexible material (e.g., leather, artificial leather, or other material) front portion 1112, while plates 1159*b* and 1159*c* are covered by the generally flexible material of the rear portion 1108. In one embodiment, the thin plates are between 0.4 mm and 1.0 mm thick. Other thicknesses may be used. The spine 1114 does not include a reinforced plate and is flexible to permit the front portion 1112 and the rear portion 1108 to be angled with respect to one another. The cover 1102 is constructed to fold in a closed configuration, shown in FIGS. 13 and 14, in which the front side 1106 of the shell 1104 is concealed and in which the front portion 1108 is flush with the bezel 1105 and the rear portion 1108 is flush with the back side 1110.

Figure 12:
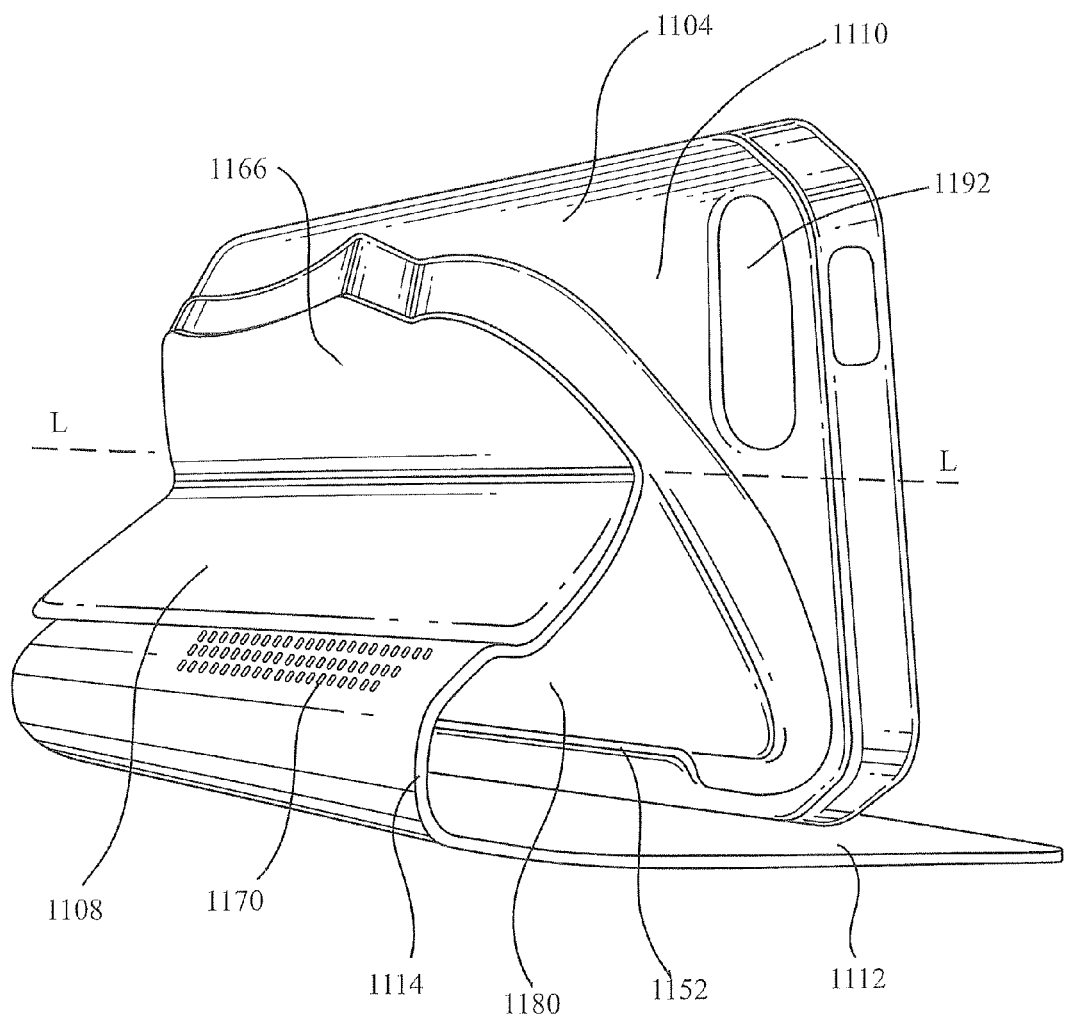
FIG. 12 is an isometric view of the sound amplifying case shown in FIG. 11, viewed from a back and left side thereof in the open configuration.

The cover 1102 is constructed to fold in the open configuration, shown in FIGS. 11 and 12. In the open configuration, the shell 1104 can extend at various angles with respect to the front portion 1108 and the rear portion 1112. For example, in the open configuration, the shell 1104 can be angled between 90 degrees and 30 degrees with respect to the front portion 1108 of the cover 1102. Friction forces between the bezel 1105 and the front portion 1108 can retain the shell 104 at an angle with respect to the front portion 1108.

As shown in FIG. 12, the rear portion 1108 has an end 1166 (optionally reinforced by plate 1159*c*) attached to the back side 1110 of the shell 1104 above a bend line L-L which is located in the rear portion 1108 between plates 1159*b* and 1159*c*. The remainder of the rear portion 1108 below bend line L-L is unattached to the back side 1110 of the shell 1104. The rear portion 1108 bends about line L-L away from back side 1110 such that the rear portion 1108 below bend line L-L is generally angled with respect to back side 1110. In one example embodiment, in the open configuration, the rear portion 1108 can be angled up to substantially 90 degrees with respect to the back side 1110.

In one embodiment seen in FIG. 12 a plurality of apertures 1170 are formed above the spine 1114. When the case 1100 is in the closed configuration, as shown in FIG. 14, one or more of the apertures 1170 align with the sound outlet port 1152, thereby permitting a path for amplified sound from sound outlet port 1152 to be emitted through the case 1100 even when the case 1100 is in the closed configuration.

In the open configuration shown, for example, in FIGS. 11 and 12, an acoustic chamber 1180 is formed between the back side 1110 of the shell 1104 and the cover 1102 and, more specifically, between the back side 1110, the rear portion 1108 of the cover 1102, and a part of the front portion 1112 of the cover 1102 between the spine 1114 and the part in contact with the bezel 1105. The acoustic chamber 1180 is constructed to receive sound emitted from the sound outlet port 1152 and redirect the sound out of the chamber 1180. The plates 1159*b* and 1159*a* (or a portion thereof) can be helpful in amplifying at least certain frequencies of the sound directed into the acoustic chamber 1180.

Figure 13:
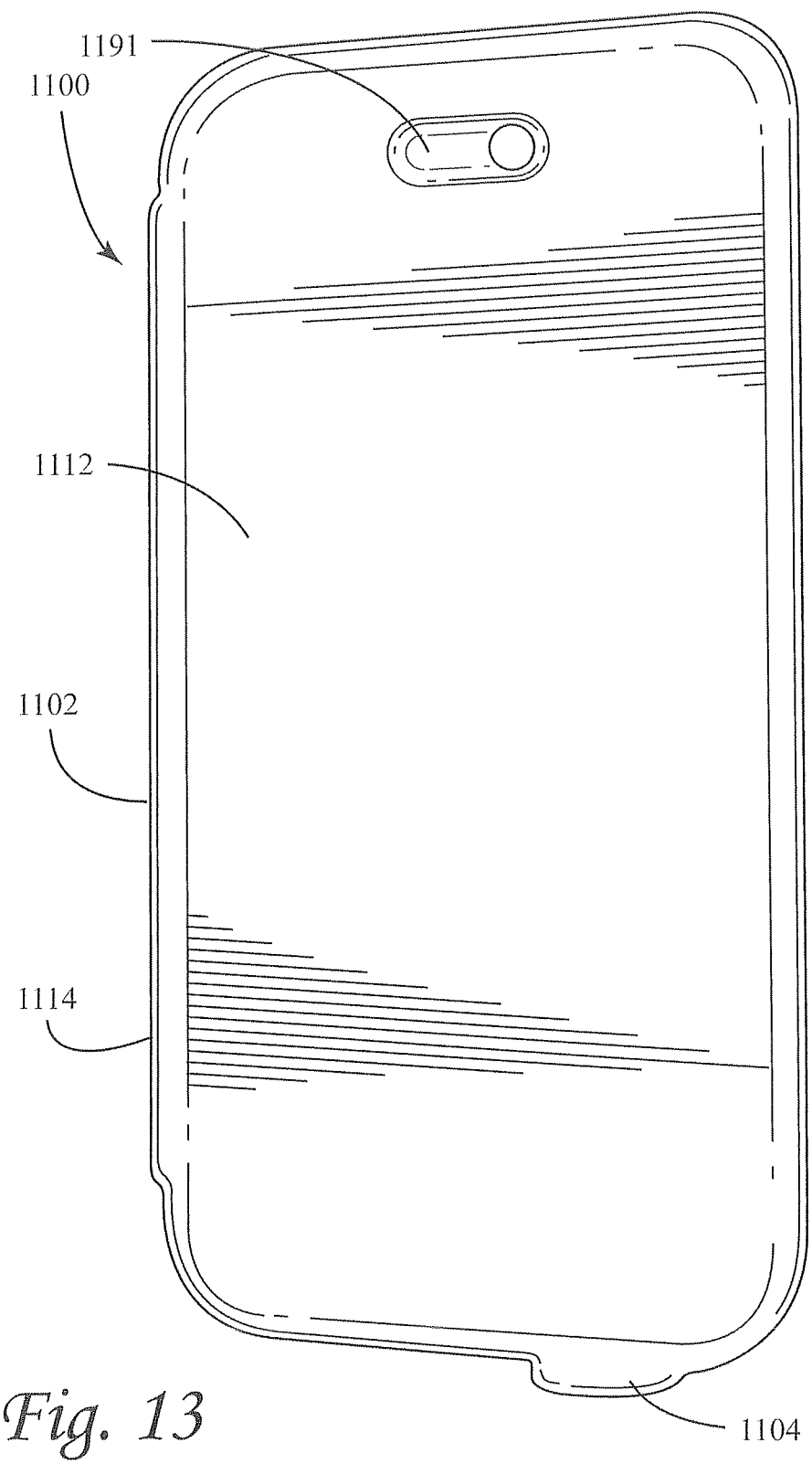
FIG. 13 is a front plan view of the case shown in FIG. 11, in a closed configuration.

As shown in FIGS. 11 and 13, the front portion 1112 of the cover 1102 can include at least one aperture 1191. Such aperture 1191 can be aligned with a port (such as a speaker) of an electronic device (not shown) retained in the shell 1104 when the case 1100 is in the closed configuration. Also, as shown in FIGS. 11, 12, and 14, the shell 1104 can include at least one aperture 1192, which can be aligned with a port, such as a camera lens of an electronic device (not shown) retained in the shell 1104.

There have been described and illustrated herein embodiments of a sound amplifying case for electronic devices. While particular embodiments have been described, it is not intended that the invention be limited thereto, as it is intended that the invention be as broad in scope as the art will allow and that the specification be read likewise. Thus, while particular sound amplifying cases have been described, it will be appreciated that other cases are possible as well. In addition, while a particular type of case suitable for tablet computers has been disclosed, it will be understood that similar cases can be used for other electronic devices, such as cell phones, phablets, and electronic media players. Moreover, while particular configurations of sound channels have been mentioned in reference to U.S. Patent Application Publication No. 2014/0057685, it will be appreciated that other configurations of a sound channel could be used as well. It will therefore be appreciated by those skilled in the art that yet other modifications could be made to the provided invention without deviating from its spirit and scope as claimed.

What is claimed is:

1. A sound amplifying case for an electronic device secured to the case, the case comprising:
    a shell constructed to receive and secure the electronic device on a front side of said shell, said shell having a sound channel formed therein constructed to receive sound from the electronic device at an inlet sound port on said front side of said shell, amplify said redirected sound, and direct said amplified sound to an outlet sound port on a back side of said shell; and
    a folding cover attached at one end thereof to said back side of said shell and extending around one edge of said shell to a free end, wherein when said case is in an open configuration said cover is constructed to fold between said attached end and said free end forming an acoustic chamber between said cover and said back side of said shell, and wherein said acoustic chamber receives said amplified sound from said outlet sound port and further amplifies and redirects said received sound out of the acoustic chamber,
    wherein the cover includes a front portion and a back portion foldable along a spine between said front portion and said back portion, said front portion configured to conceal said front side of said shell when said case is in a closed configuration and configured to reveal said front side of said shell when said case is in said open configuration, and wherein in said open configuration said shell is retained between said front portion and said back portion at an angle with respect to said front portion,
    wherein said sound channel is raised with respect to a surface of said back side of said shell, and
    wherein said attached end of said back portion of said cover includes a first part extending from said raised sound channel and includes a second part extending from said surface of said back side of said shell.

2. The case according to claim 1, wherein said cover has at least one groove formed in said front portion, said groove constructed to receive an edge of said shell to retain said shell therein when said case is in said open configuration.

3. The case according to claim 1, wherein said acoustic chamber is constructed to redirect said sound towards said front side of said shell.

4. The case according to claim 1, wherein said shell includes a gasket surrounding said inlet sound port, said gasket constructed to seal around a speaker of the electronic device when the electronic device is secured to said shell.

5. The case according to claim 1, wherein said sound channel has an outer surface that extends around a side of said shell between said front side and said back side.

6. The case according to claim 1, wherein said outlet sound port is elongated in a direction parallel to said surface of said back side of said shell.

7. The case according to claim 6, wherein in said open configuration, said outlet sound port directs sound into said acoustic chamber in a direction toward said front portion of said cover.

8. The case according to claim 1, wherein in said open configuration, said acoustic chamber formed has a generally triangular cross section.

9. The case according to claim 1, wherein said folding cover includes a substantially rigid material encased in a flexible material such that said acoustic chamber is constructed to amplify one or more frequencies of the emitted sound.

10. The case according to claim 1, wherein at least one opening is formed in said cover between said first part and said second part.

11. The case according to claim 10, wherein said opening between said first part and said second part is constructed to emit sound received from said outlet sound port of said shell when said case is in said closed configuration.

12. The case according to claim 11, wherein the opening is formed as a slit.

13. The case according to claim 12, wherein when said case is in said open configuration, said first part extends at a first angle with respect to said surface of said back side of said shell and said second part extends at a second angle with respect to said surface of said back side of said shell, wherein said first angle is less than said second angle.

* * * * *